United States Patent [19]
Luehring

[11] Patent Number: 5,706,776
[45] Date of Patent: Jan. 13, 1998

[54] FUEL TANK BACKFILLING SYSTEM FOR VEHICLES

[76] Inventor: Elmer L. Luehring, 2671 Scarborough Rd., Cleveland Heights, Ohio 44106

[21] Appl. No.: 802,480

[22] Filed: Feb. 20, 1997

[51] Int. Cl.$^6$ .................................................. F02B 77/00
[52] U.S. Cl. ........................................ 123/198 D; 60/281
[58] Field of Search .................... 60/281, 283, 288; 123/510, 511, 514, 516, 521, DIG. 3, 198 D, 198 P, 568, 570; 220/88.3, 89.1

[56] References Cited

U.S. PATENT DOCUMENTS

| | | |
|---|---|---|
| 1,953,808 | 4/1934 | Kenneweg ............................ 123/510 |
| 2,059,005 | 10/1936 | Lane ................................... 123/510 |
| 4,731,992 | 3/1988 | Krumscheid ............................ 60/281 |
| 5,216,996 | 6/1993 | Kato . | 
| 5,501,206 | 3/1996 | Takebayashi . |
| 5,533,493 | 7/1996 | Atanasyan . |

*Primary Examiner*—Thomas N. Moulis
*Attorney, Agent, or Firm*—Chattman, Gaines & Stern

[57] ABSTRACT

A backfilling system for a liquid fuel tank of a vehicle using engine exhaust gas to prevent the accumulation of explosive vapors in the fuel tank. Exhaust gas is cooled, filtered and regulated in pressure before entering the fuel tank.

11 Claims, 1 Drawing Sheet

FUEL TANK BACKFILLING SYSTEM FOR VEHICLES

DISCLOSURE DOCUMENT

A Disclosure Document was filed with the United States Patent and Trademark Office on Oct. 29, 1996. The Disclosure Statement for Apparatus To Provide Purge Gas For A Fuel Tank Being Emptied During Use is identified as 407629.

TECHNICAL FIELD

The present invention relates to vehicles having engines using liquid fuel, and particularly to a backfilling system for vehicles having engines using liquid fuel whose vapor is explosive and/or combustible when mixed with air.

BACKGROUND OF THE INVENTION

Now, vehicles with engines using liquid fuel carried in a rigid tank present a hazard when the vented space above the fuel in the tank being emptied becomes mixed with enough oxygen to become explosive or combustible. Fuel tanks used in vehicles are normally vented to allow removal of liquid fuel contained in them. The venting is typically from the atmosphere which is approximately twenty percent oxygen. Mixed vapors of the liquid fuel and vent air can be combustible and explode if ignited by a tank perforation or electrical discharge.

Proposals have been made in the past to backfill the fuel tank with nitrogen. There are problems with this proposal in that special tanks would be needed and special handling required. The extra weight and space required by the nitrogen tanks comes with a large economic penalty to some vehicles, e.g., aircraft. Yet it is just such vehicles, aircraft, that are of the greatest concern for the hazards of explosive vapors which may be ignited by electrical discharge within the tank or by perforation of the tank from some outside projectile, all endangering the operators and payload of the vehicles were it to become uncontrollable.

It is an object of the present invention is to provide a device that removes the hazard of combustion of liquid fuel vapor in a vehicular fuel tank.

Another object of the present invention is to backfill the fuel tank with a low cost and readily available gas that will not support combustion or explosion.

SUMMARY OF THE INVENTION

This invention is directed to providing a novel fuel tank device of the character described, one that solves the above and many other problems in a wide variety of trades and satisfies the need for a novel fuel tank device that backfills the empty space of a fuel tank with engine exhaust gas instead of explosive and/or combustible liquid fuel vapor and air.

In its broader aspects, the backfilling system of the present invention is a device in a machine for moving a load from place to place. The device includes a rigid tank containing liquid fuel that is delivered to an internal combustion engine. The engine produces by-product exhaust gas incapable of supporting combustion. The fuel tank has a vent. The device further includes a duct. The duct communicates the exhaust gas from the engine to the tank vent so that the exhaust gas occupies the space created by the liquid fuel as the liquid fuel is consumed by the engine.

The various features and advantages of the invention will become more apparent from the detailed description of a preferred embodiment of the invention when considered along with the accompanying drawing.

BEST MODE FOR CARRYING OUT THE INVENTION

Figure 1:
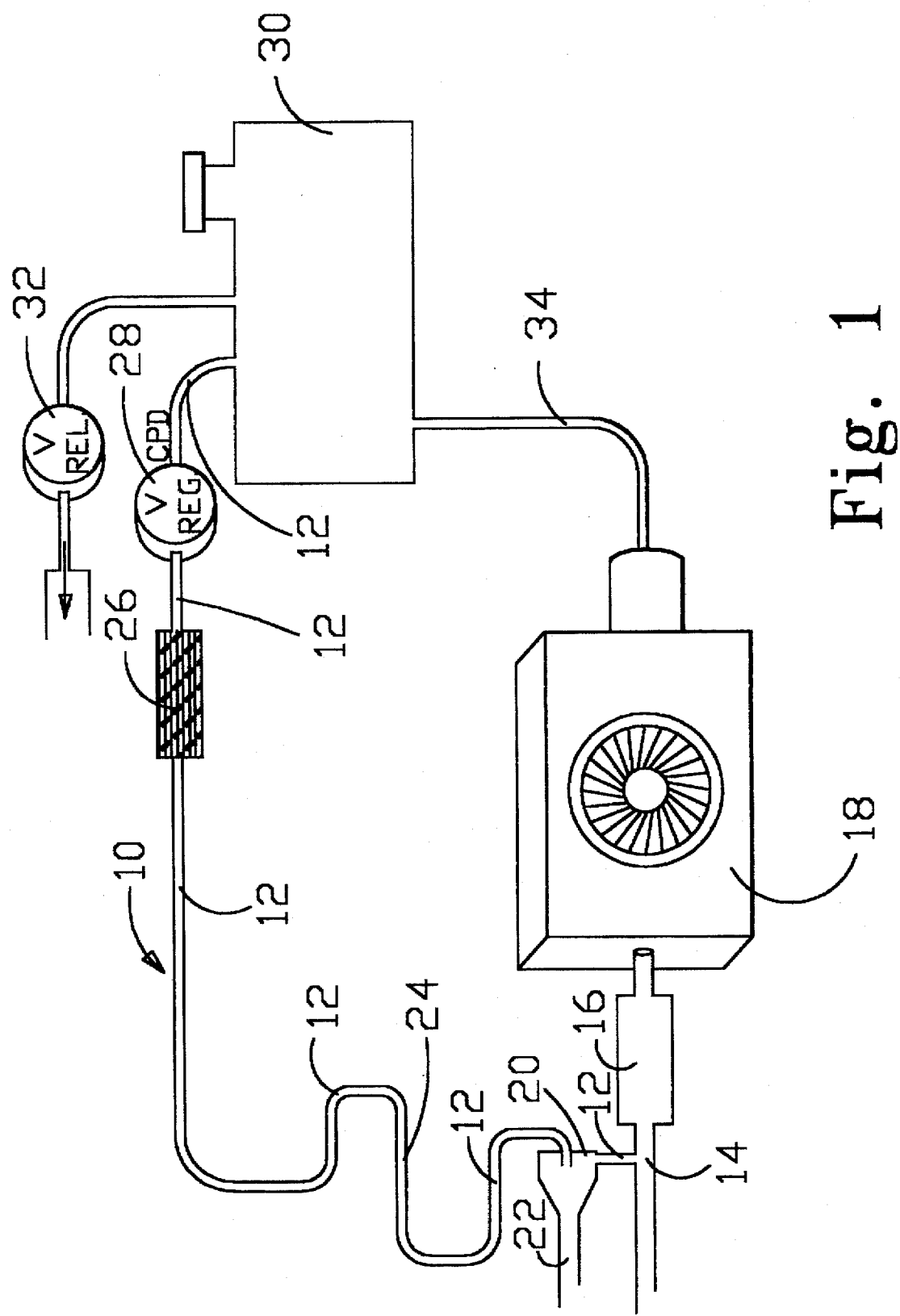
FIG. 1 is a schematic illustration of an engine equipped with a backfilling system in accordance with a preferred embodiment of the present invention.

Referring to the drawing in greater detail, the invention is incorporated in a duct system for backfilling generally designated 10, which includes a metal duct 12 connected to an exhaust pipe 14 coming from an exhaust system 16 which carries the exhaust gases and particles produced by an internal combustion system 18. Duct 12 is a bypass tube for the exhaust gases. Exhaust gas is a noncombustible gas. The duct can be metal vent tubing of a size to lightly pressurize the fuel tank without causing untoward expansion of the fuel tank which may be additionally vented by pressure relief means. The duct passes into a venting tube 20 where a portion of the exhaust gases is vented into the atmosphere through tube 22. The venting tube allows the pressure of the exhaust gases to be only a little greater than atmospheric pressure. A length 24 of the duct 12 between the venting tube 20 and a filter 26 can act as a heat exchanger for the exhaust gases. The exhaust gases coming out of the internal combustion engine 18 are hot and need to be cooled. A length of duct will allow the gases to be cooled by transferring the heat to the air surrounding the duct, or a liquid cooling tube can be situated on the tubing which will accomplish the same effect, i.e., cooling the gases. The duct 12 conducts the exhaust gases to a filter system 26. The filter may have a fibrous, metallic, ceramic or any other porous material element. The filtering system removes solid particles from the exhaust gas. A filter element may also be located in the venting system 20. The duct 12 continues from the filter to a regulating valve 28 and then into the top of a fuel tank for liquids 30. Normally the fuel tank will contain fuel vapor, air and liquid fuel. When the fuel tank is emptying, exhaust gases will enter the fuel tank. Excess fuel vapor can escape through the pressure relief valve 32. The liquid fuel is fed into the internal combustion engine through fuel line 34. The pressure regulating valve 28 and the pressure relief valve 32 are both constructed to respond to a differential pressure between the inside and the outside of the fuel tank 30, attempting to keep the difference constant. When the system is so equipped and the fuel content of the tank 30 is held constant, a rapid decrease in atmospheric pressure (or increase in vehicle altitude) would cause the pressure relief valve 32 to open. A rapid increase in pressure (or decrease in vehicle altitude) would cause the pressure regulating valve 28 to open. In a system having no regulating valve, the flow in the duct 10 reverses as atmospheric pressure is reduced and the tank vapors mix with exhaust gas in the venting tube 20, passing to the atmosphere.

Exhaust gas coming out of an internal combustion engine 18 is passed through an exhaust system 16 and a portion enters a duct 12. The exhaust gas portion passes into a venting system 20 where the pressure of the exhaust gas drops to near atmospheric pressure. The exhaust gas in duct 12 is cooled by traveling a length 24 of the duct and enters the filter 26. The exhaust gas then passes into the fuel tank 30. Any excess vapors escape out of the fuel tank through pressure relief valve 32 and may be directed to a vapor absorption system (not shown).

EXAMPLE 1

A gasoline powered lawn mower was fitted with the duct system. Copper tubing was connected to the exhaust system of the internal combustion engine to receive a portion of the exhaust gas. The tubing extended the width of the engine whereby the exhaust gases cooled within the tubing. The tubing was coupled to a metal-wool and cotton ball element in a filter housing designed to tightly cover the vent cap of the engine fuel tank. Exhaust gas entered the top of the fuel tank. A small opening in the side of the metal venting tube prevented excessive pressure at the fuel tank. The exhaust gas filled the fuel tank as the fuel was consumed thereby preventing entrance of oxygen that could ignite or explode with fuel vapors within the fuel tank.

The present invention has been described with a degree of particularity. It is the intent, however, that the invention include all modifications and alterations from the disclosed embodiments falling within the spirit or scope of the appended claims.

What is claimed is:

1. An apparatus for moving a load from place to place comprising:
   a. a rigid tank containing a liquid fuel that is delivered to an internal combustion engine, said engine producing by-product exhaust gas incapable of supporting combustion and wherein said tank having a vent; and
   b. a duct that can carry exhaust gas at near atmospheric pressure from a vented chamber supplied with said gas from said engine exhaust whereby said exhaust gas occupies space created by depletion of liquid fuel used by said engine.

2. The apparatus according to claim 1 wherein said duct is a tube.

3. The apparatus according to claim 1 wherein said duct further including a filtering means for removing particulate matter from the exhaust gas.

4. The apparatus according to claim 1 wherein said duct further including a pressure regulating system for controlling the pressure of the exhaust gas as it enters said fuel tank and a pressure relief system for venting excess fuel vapor.

5. The apparatus according to claim 2 wherein said tube is made of metal.

6. The apparatus according to claim 3 wherein said filter is composed of a porous ceramic element.

7. The apparatus according to claim 2 wherein said tube is of a length whereby the exhaust gas is effectively cooled to the ambient temperature of said fuel tank.

8. The apparatus according to claim 3 wherein said filter is composed of a porous metallic element.

9. The apparatus according to claim 3 wherein said filter is a fibrous element.

10. A fuel tank backfilling system for an internal combustion engine comprising:
    a. a fuel tank;
    b. a combustion engine producing exhaust gas, wherein said exhaust gas is provided to said fuel tank which is emptying during use of said engine;
    c. a gas duct; and
    d. a vented chamber, wherein said vented chamber receives said exhaust gas from said internal combustion engine and said gas duct receives said exhaust gas from said vented chamber, wherein said vented chamber designed to minimize the difference in pressure between the atmosphere and said gas duct under varying operating conditions of said engine and wherein said exhaust gas passes through said gas duct from said vented chamber to said fuel tank.

11. A fuel tank backfilling system comprising:
    a. an internal combustion engine producing by-product exhaust gas;
    b. a fuel tank, wherein said fuel tank supplying liquid fuel to said internal combustion engine;
    c. an atmospheric vented duct chamber;
    d. a duct, wherein said atmospheric vented duct chamber provides pure exhaust gas at near atmospheric pressure to a cooling duct from said internal combustion engine;
    e. a filter; and
    f. a regulating valve, wherein said cooling duct carrying said exhaust gas to said filter and said regulating valve and then to top of said fuel tank that contains the liquid fuel supplying said internal combustion engine and wherein said fuel tank being separately vented at the top by a pressure relief valve.

* * * * *